(12) United States Patent
Haga

(10) Patent No.: US 7,710,621 B2
(45) Date of Patent: May 4, 2010

(54) IMAGE FORMING APPARATUS, IMAGE FORMING SYSTEM, IMAGE FORMING METHOD AND COMPUTER-READABLE MEDIUM

(75) Inventor: Tatsuyoshi Haga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 590 days.

(21) Appl. No.: 11/640,920

(22) Filed: Dec. 19, 2006

(65) Prior Publication Data

US 2008/0123129 A1 May 29, 2008

(30) Foreign Application Priority Data

Mar. 3, 2006 (JP) .............................. 2006-058190

(51) Int. Cl.
*G06K 1/00* (2006.01)
(52) U.S. Cl. ........................ 358/540; 358/1.1; 358/468; 707/205
(58) Field of Classification Search .................. 358/1.1, 358/468, 540; 707/205
See application file for complete search history.

(56) References Cited

U.S. PATENT DOCUMENTS 6,119,132 A * 9/2000 Kuwano ...................... 358/468

6,896,178 B2 * 5/2005 Hiramoto ................... 358/1.18

FOREIGN PATENT DOCUMENTS

JP 8-154177 6/1996

* cited by examiner

*Primary Examiner*—Kimberly A Williams
(74) *Attorney, Agent, or Firm*—Finnegan, Henderson, Farabow, Garrett & Dunner, L.L.P.

(57) ABSTRACT

Disclosed is an image forming apparatus including: a communication section connected to an information management apparatus to manage a data with a correspondence of the data to the management information and an input apparatus to accept a manuscript information, to communicate with each other; an image forming section to form an image on a recording paper; and a controlling section to transmit the management information to the information management apparatus through the communication section, to receive the data corresponding to the transmitted management information from the information management apparatus, to convert the received data into a barcode information, to form a composite information by combining the barcode information and the manuscript information received from the input apparatus, and to allow the image forming section to form an image of the composite information.

4 Claims, 9 Drawing Sheets

FIG.5

| MANAGEMENT NUMBER 51 | NAME 52 [1] | AGE 53 [2] | SEX 54 [3] | TELEPHONE NUMBER 55 [4] | ADDRESS 56 [5] | INDIVIDUAL ID 57 [6] |
|---|---|---|---|---|---|---|
| 1 | A | 25 | MALE | 03-x x x x | TOKYO x x x | 253712 |
| 2 | B | 38 | FEMAL | 06-x x x x | OSAKA x x x | 283885 |
| 3 | C | 54 | FEMAL | 03-x x x x | TOKYO x x x | 345009 |

VARIABLE DATABASE 50

FIG.6

VARIABLE PRINT CONFIGURATION SCREEN 61

VARIABLE PRINT CONFIGURATION

PRINT POSITION 62
- X: 150-200mm
- Y: 100-150mm

DATA RANGE SPECIFICATION 63
- AGE: TWENTIES
- SEX: MALE
- REGION: UNSPECIFIED
- TELEPHONE NUMBER: UNSPECIFIED

PRINT INFORMATION 64: INDIVIDUAL ID

FIG. 7A
YOUR ID IS AS FOLLOWS.
READ IT WITH A CELL PHONE.
ORIGINAL PRINT DATA 71
FIG. 7B
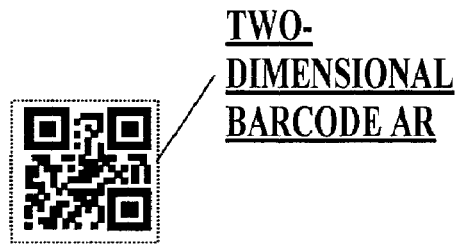
TWO-DIMENSIONAL BARCODE AR
FIG. 7C
YOUR ID IS AS FOLLOWS.
READ IT WITH A CELL PHONE.
COMPOSITE IMAGE 72

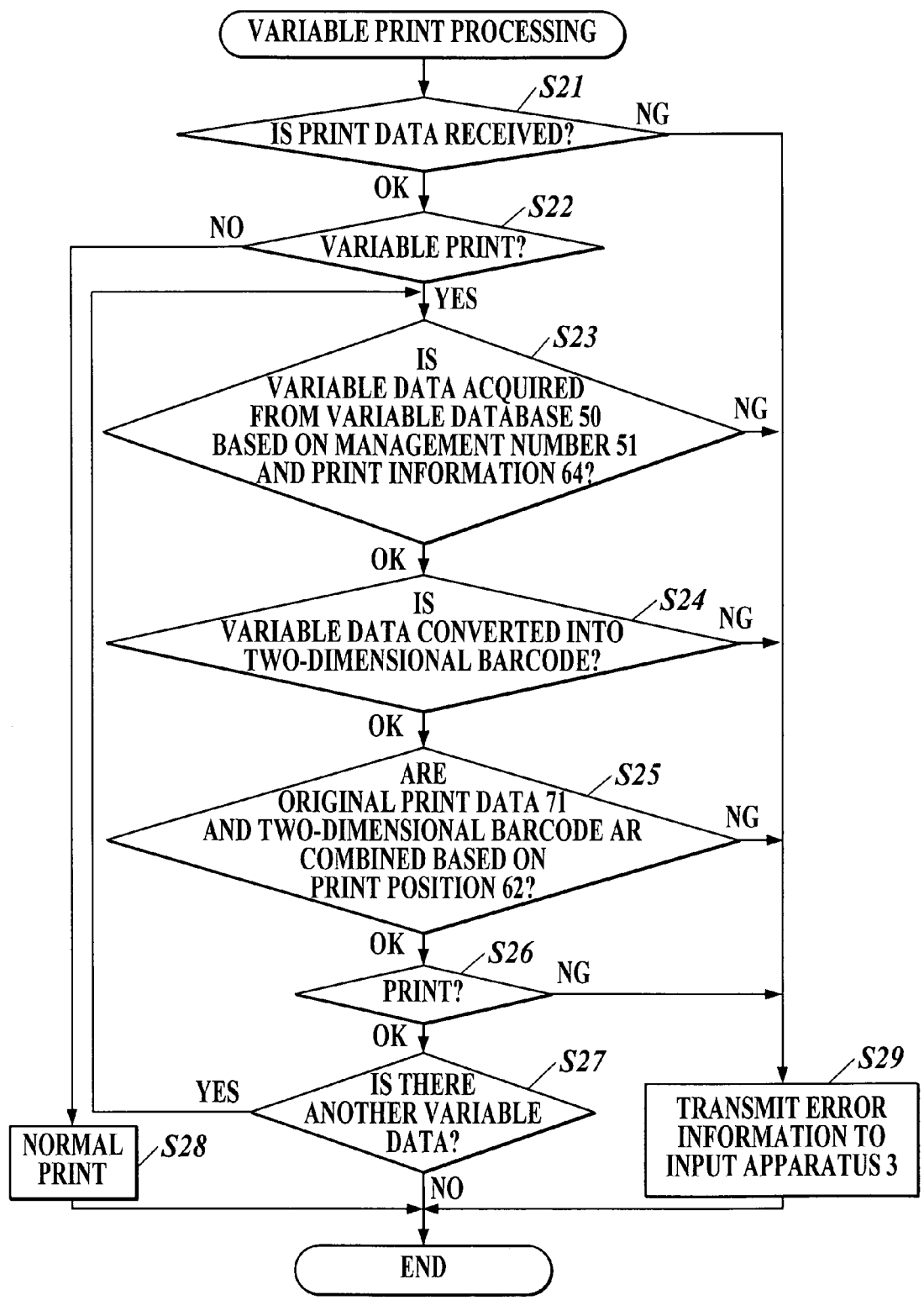

IMAGE FORMING APPARATUS, IMAGE FORMING SYSTEM, IMAGE FORMING METHOD AND COMPUTER-READABLE MEDIUM

BACKGROUND

1. Field of the Invention

The present invention relates to an image forming apparatus, an image forming system, an image forming method and a computer-readable medium.

2. Description of Related Art

In earlier development, a technique to convert a user ID (identification), telephone number and the like (hereinafter referred to as a data) to a coded image of a barcode and to record the barcode to a recording paper has been known. On the recording paper of the same sheet, manuscript information described in characters or the like is also included. For example, direct mails, accounts of utility bill and product stickers on which serial numbers are printed are known.

The above-described data and manuscript information are formed in an input apparatus such as a PC (personal computer) or the like. Hereinafter, a combination of the data and manuscript information are referred to as print information. The formed print information is sent to an image forming apparatus, and printed on a recording paper. As for the image forming apparatus, a digital copier, printer, facsimile and the like are known (for example, see JP 08-154177A).

However, in the above-described earlier developments, the print information was transmitted from the input apparatus to the image forming apparatus every time printing was performed on a recording paper. That is, when plural printings of same manuscript information and different data are performed, print information having different barcode was formed and transmitted from the input apparatus to the image forming apparatus in each printing. Thus, the transmission of the information was inefficient.

In the case where the data is shared between the input apparatus and the image forming apparatus, when the data is to be changed, it was necessary to operate both of the input apparatus and the image forming apparatus to change the data. That is, it has been problematic that considerable work of a user is required for data management.

SUMMARY

It is one of the objects of the present invention to realize effective transmission of information and to reduce the work of a user for data management.

In order to attain the above object, according to a first aspect of the invention, an image forming apparatus comprises: a communication section connected to an information management apparatus to manage a data with a correspondence of the data to a management information and an input apparatus to accept a manuscript information, to communicate with each other; an image forming section to form an image on a recording paper; and a controlling section to transmit the management information to the information management apparatus through the communication section, to receive the data corresponding to the transmitted management information from the information management apparatus, to convert the received data into a barcode information, to form a composite information by combining the barcode information and the manuscript information received from the input apparatus, and to allow the image forming section to form an image of the composite information.

According to a second aspect of the invention, an image forming system comprises: an image forming apparatus; an input apparatus; and an information management apparatus, wherein the image forming apparatus comprises: an image forming section to form an image on a recording paper; a communication section connected to the input apparatus and the information management apparatus, to communicate with each other; a controlling section to transmit a management information to the information management apparatus through the communication section, to receive a barcode information corresponding to the transmitted management information from the information management apparatus, to form a composite information by combing the received barcode information and the manuscript information received from the input apparatus, and to allow the image forming section to form an image of the composite information, wherein the input apparatus comprises: an operation section to accept an input information; a communication connection section connected to the information management apparatus and the image forming apparatus, to communicate with each other; and a communication controlling section to transmit the input information input on the operation section to specify the management information to the information management apparatus through the communication connection section, to receive the management information corresponding to the input information from the information management apparatus, and to transmit the received management information and the manuscript information to the image forming apparatus, and wherein the information management apparatus comprises: a storage to store a data with a correspondence of the data to the management information; an information communication section connected to the input apparatus and the image forming apparatus, to communicate with each other; and an information controlling section to receive the input information from the input apparatus through the information communication section, to specify the management information corresponding to the received input information among the management information in the storage, to transmit the specified management information to the input apparatus, to receive the management information from the image input apparatus, to specify the data corresponding to the received management information among the data in the storage, to convert the specified data into the barcode information, and to transmit the barcode information to the image forming apparatus.

According to a third aspect of the invention, an image forming method comprises the steps of: transmitting a management information to an information management apparatus which manages a data with a correspondence of the data to the management information, through a communication section connected to the information management apparatus and an input apparatus which accepts an input of a manuscript information, to communicate with each other; receiving the data corresponding to the transmitted management information from the information management apparatus; forming a composite information by converting the received data into a barcode information and combining the barcode information and the manuscript information received from the input apparatus; and forming an image of the composite information.

According to a fourth aspect of the invention, an image forming method comprises the steps of: transmitting a management information to an information management apparatus which manages a data with a correspondence of the data to the management information through a communication section connected to the information management apparatus and an input apparatus which accepts an input of a manuscript information, to communicate with each other; receiving a data corresponding to the transmitted management information from the information management apparatus; forming a composite information by converting the received data into a barcode information and combining the barcode information and the manuscript information received from the input apparatus; forming an image of the composite information; and judging whether or not there is another data for the forming of an image of a composite information, wherein in the transmitting step, when it is judged there is another data in the judging step, the management information corresponding to the another data is transmitted.

According to a fifth aspect of the invention, a computer-readable medium stores a program causing a computer to function as the sections of: a communication section connected to an information management apparatus to manage a data with a correspondence of the data to the management information and an input apparatus to accept manuscript information, to communicate with each other; an image forming section to form an image on a recording paper; and a controlling section to transmit the management information to the information management apparatus through the communication section, to receive the data corresponding to the transmitted management information from the information management apparatus, to convert the received data into a barcode information, to form a composite information by combining the barcode information and the manuscript information received from the input apparatus, and to allow the image forming section to form an image of the composite information.

According to a sixth aspect of the invention, a computer-readable medium storing a program causing a computer to function as the sections of: a communication section connected to an information management apparatus to manage a data with a correspondence of the data to the management information and an input apparatus to accept a manuscript information, to communicate with each other; an image forming section to form an image on a recording paper; and a controlling section to transmit the management information to the information management apparatus through the communication section, to receive the data corresponding to the transmitted management information from the information management apparatus, to convert the received data into a barcode information, to form a composite information by combining the barcode information and the manuscript information received from the input apparatus, to allow the image forming section to form an image of the composite information, to judge whether there is another data for forming a composite information, and to transmit the management information corresponding to the another data to the information management apparatus when it is judged there is the another data.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein;

FIG. 5 is a view showing a variable database 50;

FIG. 6 is a view showing a screen displayed on the display section 32 of the input apparatus 3;

FIGS. 7A to 7C are views to show an original print data 71, two-dimensional barcode AR and composite image 72;

FIG. 9 is a flowchart showing variable print processing.

DETAILED DESCRIPTION OF THE PREFERRED EMBODIMENT

Hereinafter, an embodiment of the present invention will be described in detail with reference to the attached drawings. It is to be noted that the scope of the invention is not limited to the illustrated examples.

Figure 1:
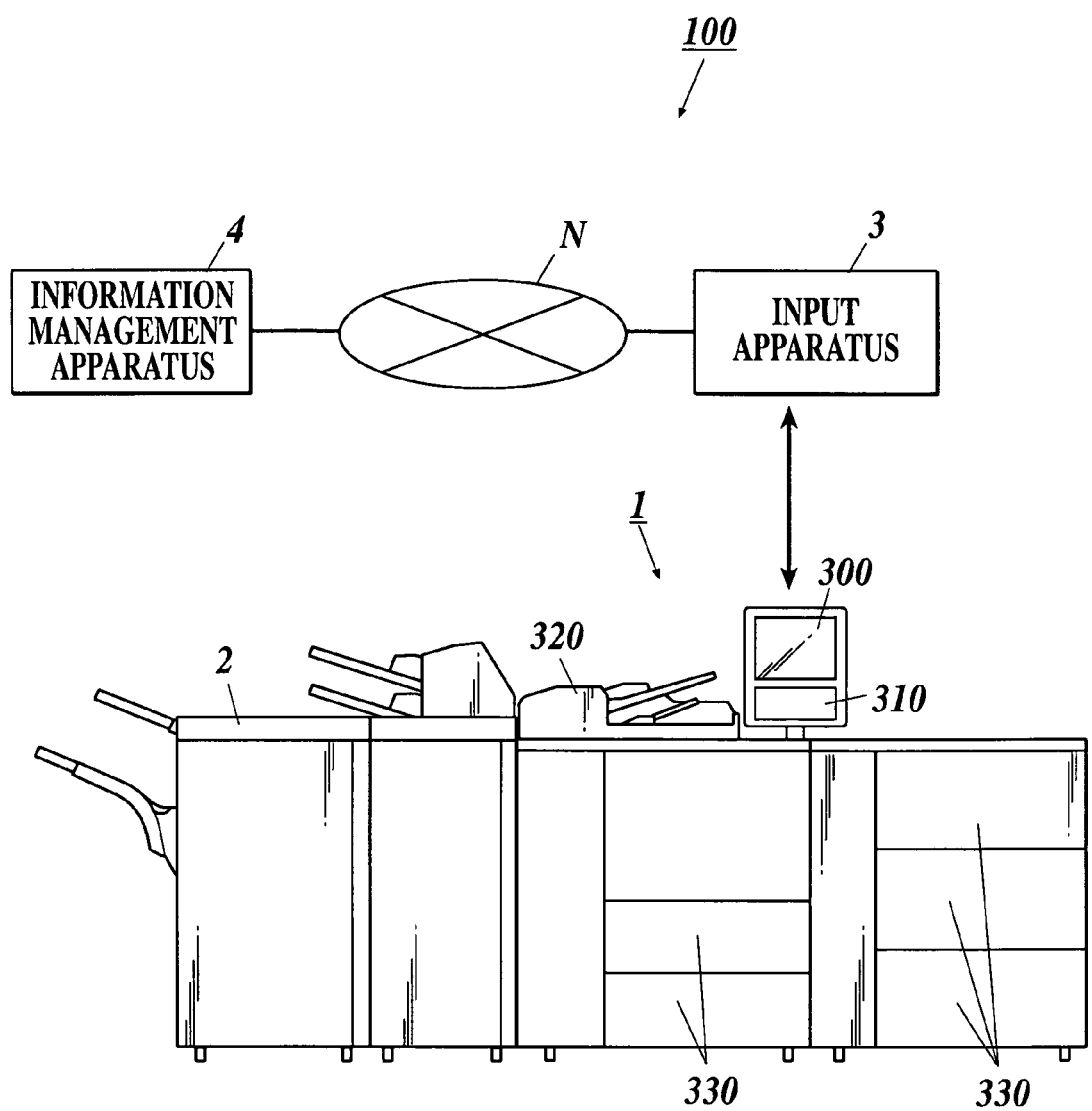
FIG. 1 is a schematic view of an image forming system 100 of the present embodiment.
Figure 2:
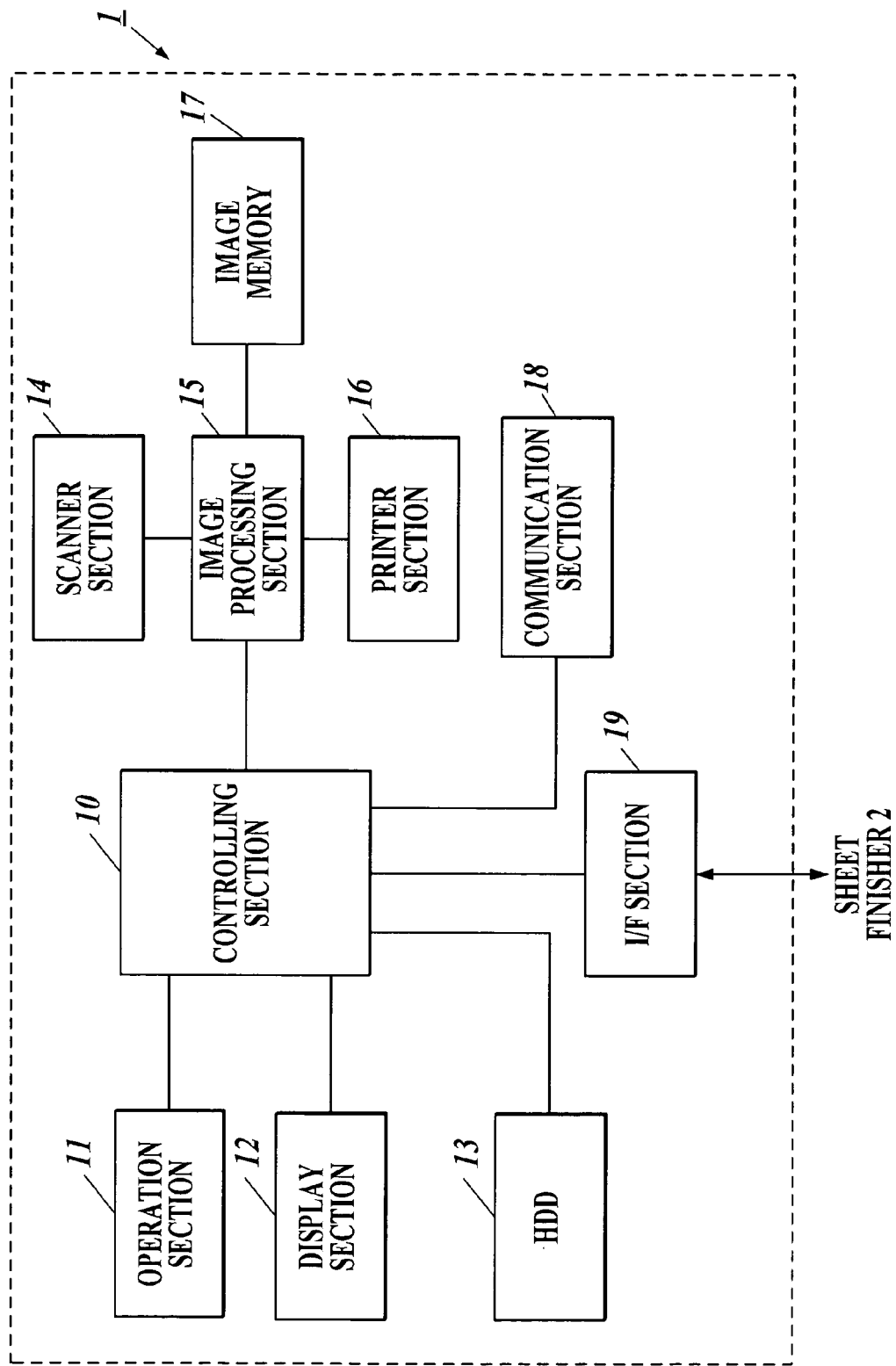
FIG. 2 is a block diagram showing internal composition of an image forming apparatus 1.
Figure 3:
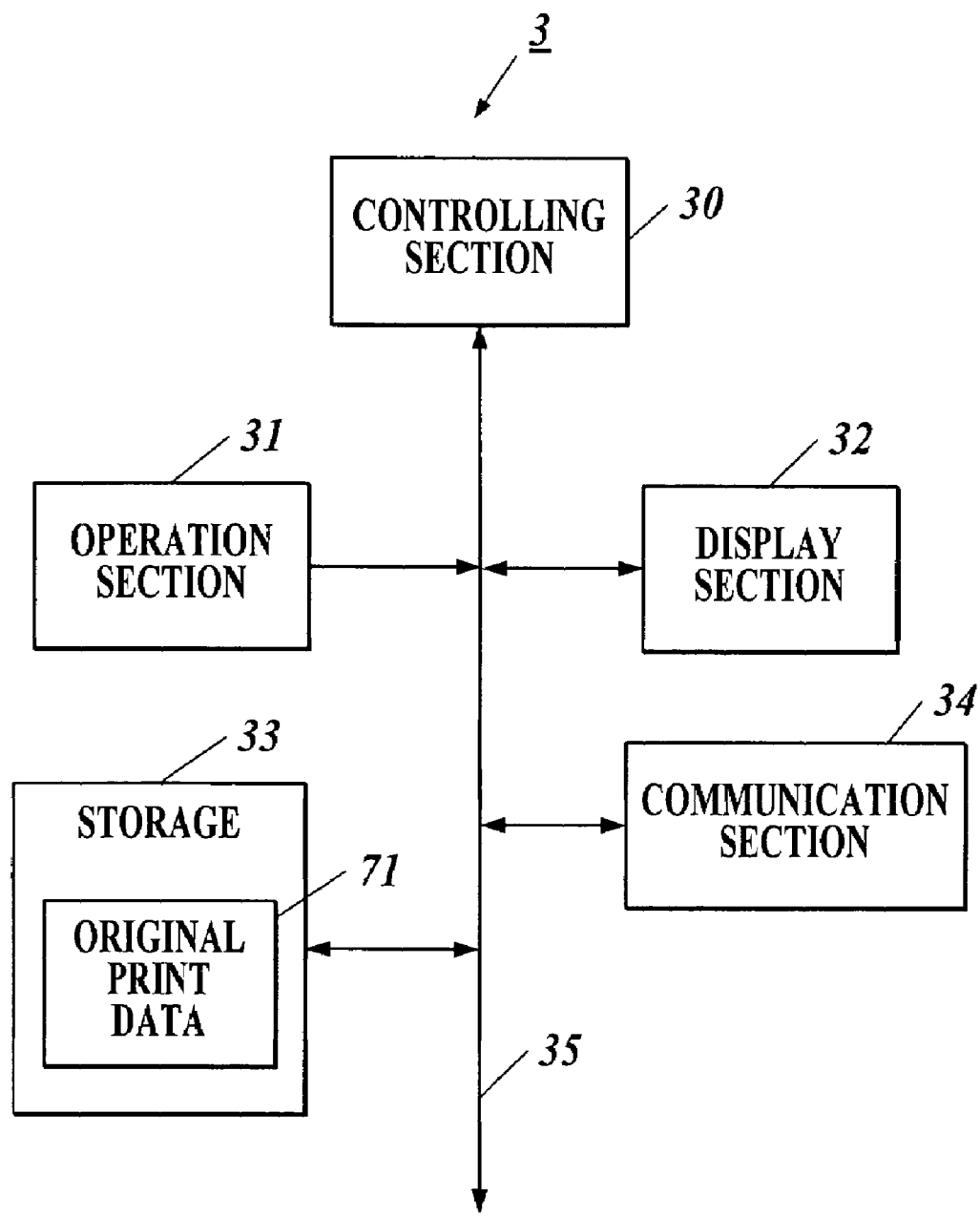
FIG. 3 is a block diagram showing internal composition of an input apparatus 3.
Figure 4:
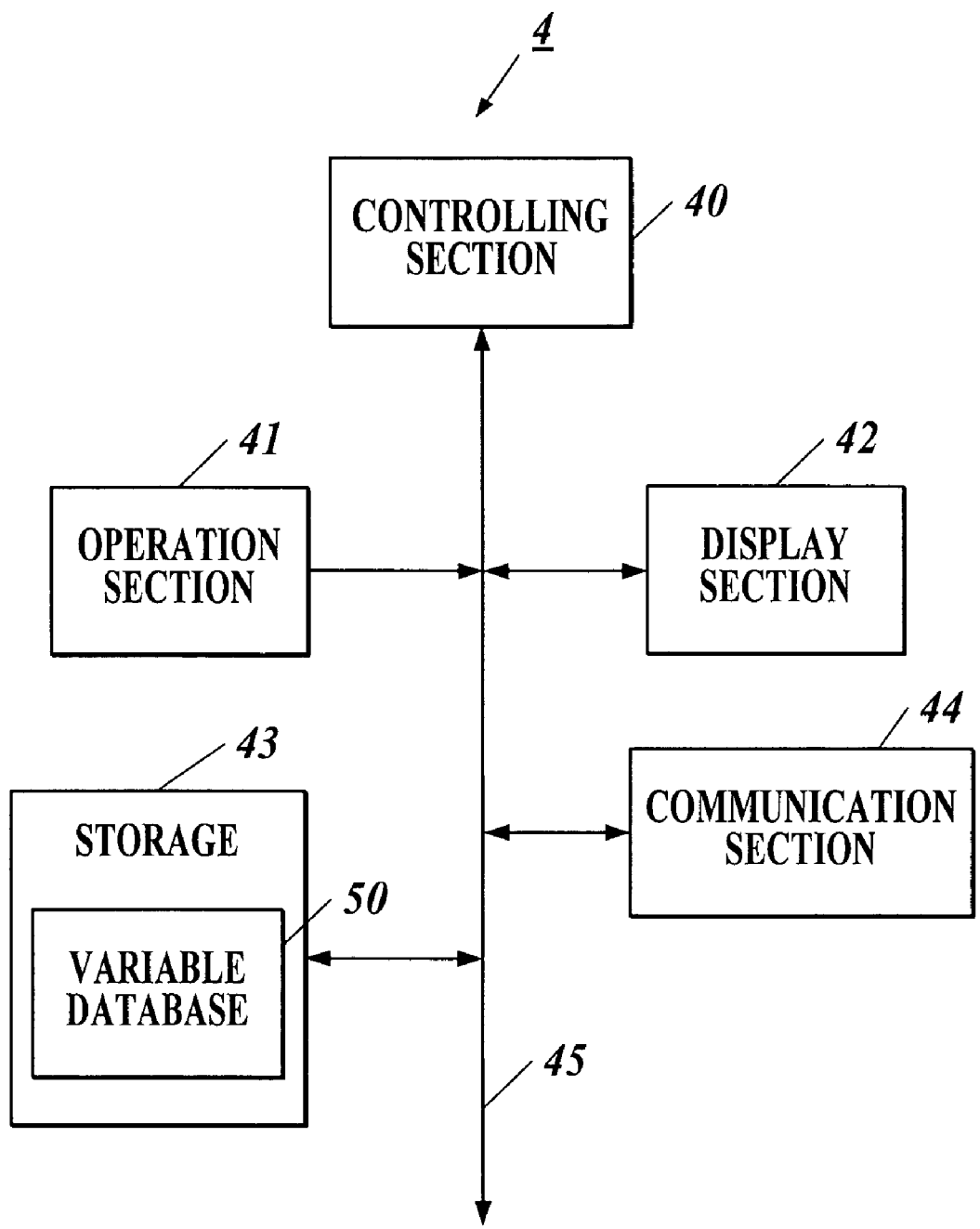
FIG. 4 is a block diagram showing internal composition of an information management apparatus 4.

The embodiment of the present invention is described with reference to FIGS. 1 to 9. First, structural composition of the embodiment is described with reference to FIGS. 1 to 4. FIG. 1 shows an image forming system 100 of the present embodiment. FIG. 2 shows internal composition of an image forming apparatus 1. FIG. 3 shows internal composition of an input apparatus 3. FIG. 4 is internal composition of an information management apparatus 4.

The image forming system 100 of the present embodiment is described with reference to FIG. 1. The image forming system 100 is a system where the image forming apparatus 1 receives an original print data 71 as the manuscript information and a variable data as the data from the input apparatus 3 and information management apparatus 4. The image forming system 100 comprises the image forming apparatus 1, a sheet finisher 2, the input apparatus 3 and the information management apparatus 4. The image forming apparatus 1, input apparatus 3 and information management apparatus 4 are connected to communicate with each other through a communication line N.

The image forming apparatus 1 is to form an image on a recording paper, and is a printer, facsimile, copier and the like. The image forming apparatus 1 comprises a display 300, an operation input key 310, a ADF (auto document feeder) 320 to feed a loaded manuscript onto a platen glass of a scanner section 14 described below, and a sheet feeding tray 330 to house recording papers of various sizes and to feed them to a printer section 16 described below.

The display 300 is composed of a CRT (cathode-ray tube), LCD (liquid crystal display) or the like, and displays various screens and processing status in response to pushing down operation of the operation input key 310 and the like. The display 300 comprises a touch panel integrally formed thereon, and detects a touch operation with a pointing device, finger tip and the like.

The operation input key 310 is a set of keys such as cursor keys, numeric keys, start key, reset key and the like. A user pushes down the operation input key 310 or touches the display 300, so as to set a configuration of printing such as number of sets, magnification, double-sided and to set a configuration of sheet-finishing such as stapling and punching. Thus, the image forming apparatus 1 is operated.

The sheet finisher 2 is to perform sheet finishing such as stapling and punching to a recording paper. The sheet finisher 2 sequentially performs sheet finishing such as stapling and punching to the configured number of recording papers set by a user.

The input apparatus 3 is a PC (personal computer) to transmit the manuscript information to the image forming apparatus 1. The input apparatus 3 is connected to the image forming apparatus 1 to communicate with each other through the communication line N.

The information management apparatus 4 is a server apparatus to transmit the variable data to the image forming apparatus 1. The information management apparatus 4 is connected to the image forming apparatus 1 to communicate with each other through the communication line N. Here, the variable data designates information such as user ID and telephone number, and is a data which a user intends to print as a converted two-dimensional barcode.

The communication line N is a network such as the internet and the like, and comprises a communication line such as a telephone line network, ISDN, leased line, mobile communication network, communication satellite line and CATV line network, and an internet service provider base station to connect them.

Next, the internal configuration of the image forming apparatus 1 is described with reference to FIG. 2. The image forming apparatus 1 comprises a controlling section 10, an operation section 11, a display section 12, an HDD (hard disk drive) 13, a scanner section 14, an image processing section 15, the printer section 16 as an image forming section, an image memory 17, a communication section 18, and an I/F section 19.

The controlling section 10 comprises a CPU (central processing unit), a ROM (read only memory), a RAM (random access memory) and the like, and controls a direction to functional sections of the image forming apparatus 1 and data communication between the functional sections. Specifically, the controlling section 10 develops a designated program among a system program and various application programs onto the RAM and executes various processing by a cooperation of the program developed on the RAM and the CPU. In particular, the ROM stores a variable print program described below.

The controlling section 10, by a variable print program, acquires the variable data from the information management apparatus 4 and converts it to a two-dimensional barcode AR of barcode information (two-dimensional barcoding). The two-dimensional barcoding designates a technique to code a data such as characters and numbers and to type or print the coded data as a two-dimensional graphic onto an object surface or paper. As for the coding format of the two-dimensional barcode AR, two-dimensional codes such as a QR (quick response) code (R), PDF 417, data matrix, maxi code can be given. In the following description, the two-dimensional barcode AR is the QR code.

The operation section 11 comprises the operation input key 310 and a touch panel as shown in FIG. 1, and outputs an operation signal to the controlling section 10, such as a pushed-down signal corresponding to a pushed-down key and a position signal corresponding to a touched position of the touch panel.

The display 12 corresponds to the display 300 shown in FIG. 1, and is composed of a CRT, LCD or the like. The display 12 displays a status of an image and operational status of each function and the like, based on a display data output from the controlling section 10.

The HDD 13 comprises a magnetic storage medium, and according to a direction of the controlling section 10, stores various information in the magnetic storage medium in a readable and rewritable format. The HDD 13 stores an image data, image forming information 20, and sheet finishing information 21. The image forming information 20 is information relating to image forming such as the number of sets to form an image, the number of pages, direction and size of an original, paper type and scale. The sheet finishing information 21 is information relating to sheet finishing such as the number of sets to be sheet-finished, the number of pages, stapling, punching, and folding. Each of the image forming information 20 and sheet finishing information 21 is set according to user's operation.

The scanner section 14 comprises a platen glass, a CCD and a light source, in which the light source scans and illuminates an original mounted by the ADF 320 and the CCD images the reflection light thereof and performs photoelectric conversion. Thus, the scanner section 14 forms an image data of the original image and outputs it to the image processing section 15.

The image processing section 15, based on a direction of the controlling section 10, compresses the image data output from the scanner section 14 and image data stored in the HDD 13, and temporary stores them in the compression memory of the image memory 17 as a compressed image data.

When the controlling section 10 outputs a direction to read out the image data, the image processing section 15 decompresses the compressed image data stored in the image memory 17 and temporary stores the decompressed data in the image memory 17. When the controlling section 10 outputs a direction of printing out, the image processing section 15 reads out the uncompressed image data by a page basis, and performs image processing such as scaling and rotation of the image data based on the image forming information 20. The image processing section 15 generates a PWM (pulse width modulation) signal based on the image data and controls the gradation of the image data with the pulse width thereof, and outputs the PWM signal to the printer section 16.

The printer section 16 comprises a LD (laser diode), a photoreceptor drum, a charging unit, a developer, a transferring unit, a fixing unit, the sheet feeding tray 330 to supply recording papers, a sheet feeding roller to convey the recording papers along with the conveying path, and the like. The printer section 16 may be a printer of the other type such as ink-jet type and thermal transfer type.

Specifically, the printer section 16 takes in a recording paper of a predetermined size and direction from any one of the sheet feeding tray 330, and conveys the recording paper onto the conveying path. Subsequently, the charging unit charges the surface of the photoreceptor drum. The LD irradiates laser light on the surface of the photoreceptor drum based on the PWM signal input from the image processing section 15, so as to form an electrostatic latent image. The developer adheres toner onto an area including the electrostatic latent image on the surface of the photoreceptor drum. The transfer unit transfers the toner to the transfer paper conveyed from the sheet feeding tray 330, and the fixing unit fixes it.

The image memory 17 comprises the compression memory which is composed of a DRAM (dynamic RAM) and temporary stores the compressed image data, and a page memory which temporary stores the uncompressed image data which is to be printed before the printing.

The communication section 18 is a functional section to perform data communication with external apparatuses such as the input apparatus 3 and information management apparatus 4 through the communication line N, and comprises a modem, a LAN interface, an USB and the like. The I/F unit 19 is a functional unit to perform data communication with the connected sheet finisher 2, and comprises a serial interface and the like.

Next, the internal composition of the input apparatus 3 is described with reference to FIG. 3. The input apparatus 3 comprises a controlling section 30 as a communication controller, an operation section 31, a display section 32, storage 33, a communication section 34 as a communication connector. These sections are connected with each other through a bus 35.

The controlling section 30 comprises a CPU, a ROM, a RAM and the like, and controls direction to each functional section constituting the input apparatus 3 and data communication between the functional sections. The controlling section 30 develops a program designated among a system program and various application programs onto the RAM and executes various processing by a cooperation of the program developed on the RAM and the CPU.

The controlling unit 30 acquires a management number 51 from the information control apparatus 4 by a cooperation with a management number configuration program described below. Subsequently, the controlling unit 30 transmits the management number 51 of management information, the original print data 71 of the manuscript information and a print position 62 to the image forming apparatus 1.

The operation section 31 comprises a key board including cursor keys, numeric keys, various functional keys and the like, and outputs a push-down signal corresponding to user's push-down operation on the keyboard to the controlling section 30. The operation unit 31 may comprise a pointing device such as a mouse.

The display section 32 is composed of a LCD, a CRT (cathode ray tube) or the like, and displays a screen according to a display signal from the controlling section 30.

The storage 33 comprises a HDD or the like, and stores various programs and data. In particular, the storage 33 stores the management number setting program and original print data 71.

The communication section 34 is a functional section to perform data communication with external apparatuses such as the image forming apparatus 1 and information management apparatus 4 through the communication line N, and comprises a modem, a LAN interface and the like.

Next, the internal composition of the information management apparatus 4 is described with reference to the FIG. 4. The information management apparatus 4 comprises a controlling section 40 of information controller, an operation section 41, a display 42, a storage 43, an information communication section, a communication section 44 of an information communication section. These sections are connected with each other by a bus 45. The controlling section 40, operation section 41, display 42, storage 43 and communication section 44 are respectively similar to the controlling section 30, operation section 31, display 32, storage 33 and communication section 34, and the difference between them is mainly described.

The storage 43 stores a variable database 50. The variable database 50 is a database of a variable data where individual name, sex and the like are the key.

Next, the variable database 50 is described as one example of the variable data stored in the storage 43, with reference to the FIG. 5. As shown in FIG. 5, the variable database 50 comprises as items a management number 51, an individual name 52, an individual age 53, an individual sex 54, an individual telephone number 55, an individual address 56 and an individual ID 57. The variable database 50 is not limited to the example shown in FIG. 5.

Each of the items comprises an item number to designate the item (name 52 [1], age 53 [2], sex 54 [3], telephone number 55 [4], address 56 [5], individual ID [6]). By designating the management number 51 and the item number, a desired variable data can be obtained. For example, in the example shown in FIG. 5, when it is designated that the management number is "1" and the item number is "2", the variable data of "25 years old" is obtained.

Next, a variable print configuration screen 61 shown on the display section 32 of the input apparatus 3 is described with reference to FIG. 6. A user can set a variable print configuration with the variable print configuration screen 61. Here, the variable print configuration designates that a user specifies a desired variable data to be converted into two-dimensional barcode among the variable data.

The variable print configuration is set by inputting a print position 62, a data range specification 63 as input information, and a print information 64 as management information. The print position 62 is configuration information to specify a print position of the two-dimensional barcode AR printed on a recording paper. A user can specify ranges of X direction and Y direction on the recording paper as the print position 62. In the example shown in FIG. 6, X direction and Y direction are specified to 150-200 mm and 100-150 mm respectively as the print position 62.

The data range specification 63 is to specify the management number 51 of the variable database 50 of the information management apparatus 4. As for the information to specify the management number 51, an age, sex, region and telephone number can be given. In the example shown in FIG. 6, a user specifies the management number 51 by specifying age-twenties, sex-male, region-unspecified and telephone number-unspecified. The print information 64 is an item name which is intended to be printed as the converted two-dimensional barcode among the variable data of the management number 51 which a user designated. For example, in the example of the variable print configuration screen shown in FIG. 6, "age-twenties" and "sex-male" are set in the data range specification 63 and "individual ID" is set in the print information 64. Accordingly, in the example of the variable database 50 shown in FIG. 5, "1" is specified in the management number 51. Moreover, the variable data of "253712" is specified in the individual ID 57 where the management number 51 is "1".

Next, a printed recording medium is described with reference to FIGS. 7A to 7C. FIG. 7A shows the original print data 71. The original print data 71 as the manuscript information is information such as text to be printed on a recording paper. In the example shown in FIG. 7A, the original print data 71 is "Your ID is as follows. Please read it with a cell phone." FIG. 7B shows the two-dimensional barcode AR set by the variable print configuration shown in FIG. 6. FIG. 7C shows a composite image 72 as composite information where the original print data 71 and the two-dimensional barcode AR are combined. As shown in FIG. 7C, the composite image 72 where the original print data 71 and the two-dimensional barcode AR are combined is printed on the image forming apparatus 1.

Figure 8:
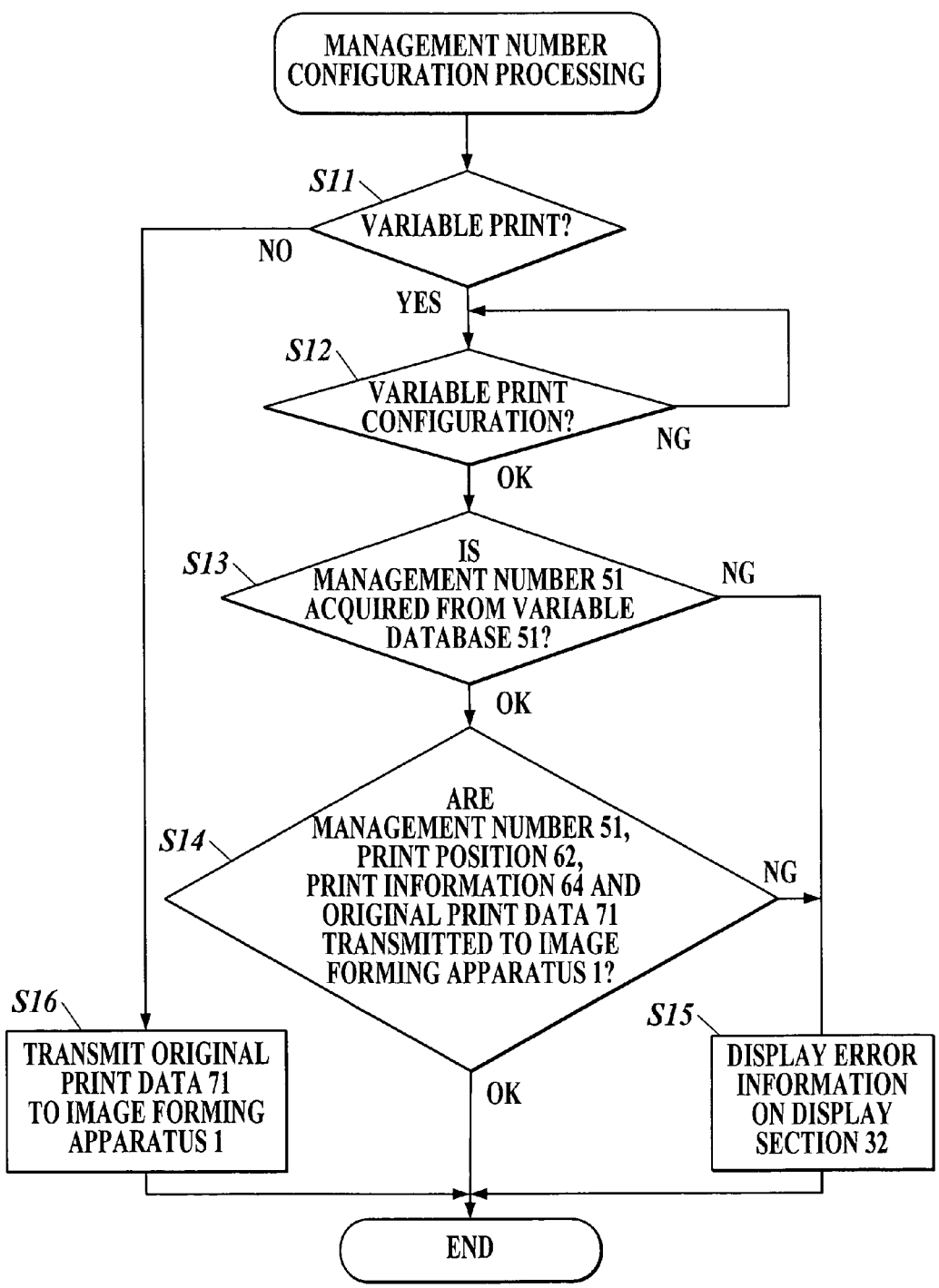
FIG. 8 is a flowchart showing management number configuration processing.

Next, a management number configuration processing executed in the input apparatus 3 is described with reference to FIG. 8. The management number configuration processing is to transmit the management number 51, print position 62, original print data 71 and the like to the image forming apparatus 1.

For example, in the input apparatus 3, the controlling section 30 executes the management number configuration processing by a cooperation of the CPU and a management number configuration program read out from the storage 33 and developed on the RAM, where user's input of an execution direction of the management number configuration processing on the operation section 31 or the like works as the trigger of the execution.

First, a user decides whether to perform the variable print or not (step S11). Specifically, the user performs an input on the operation section 31 of the input apparatus 3, and it is judged whether or not to perform the variable print based on the input. When the variable print is not performed (step S11; No), the original print data 71 is read out from the storage 33 and is transmitted to the image forming apparatus 1 (step S17). When the variable print is performed (step S11; Yes), the variable print configuration is set, and then it is judged whether the configuration has been successful or not (step S12). In the variable print configuration, the print position 62, data range specification 63 and print information 64 are set based on a user's input on the operation section 31 according to the configuration screen shown in FIG. 6. When the variable print configuration is failed (step S12; No), the process shifts to step S12. Here, failing the variable print configuration designates an input error and the like of the print position 62, data range specification 63 and print information 64.

When the variable print configuration is successful (step S12; OK), information of the data range specification 63 is transmitted to the information management apparatus 4. Then, the controlling section 40 of the information management apparatus 4 specifies the management number 51 of the variable database 50. The specified management number 51 is transmitted from the information management apparatus 4 to the input apparatus 3. Then, the input apparatus 3 receives and acquires the management number 51, and it is judged whether the acquisition has been successful or not (step S13). When the input information is insufficient to specify the management number 51 (step S13; NG), an error information is displayed on the display section 32 (step S16). The error information is to notice that the management number 51 has not been acquired. For example, the display section 32 displays "Management number could not be acquired."

When it is successful to acquire the management number 51 from the variable database 50 (step S13; OK), the management number 51, print position 62, print information 64 and the original print data 71 are transmitted to the image forming apparatus 1, and it is judged whether the transmission has been successful or not (step S14). When the transmission of the management number 51, print position 62, print information 64 and original print data 71 are failed (step S14; NG), the step shifts to step S15. Here, as for the error information of step S15, a notice of failing transmission of the management number 51, print position 62, print information 64 and original print data 71 is displayed. For example, the display section 32 displays "Data transmission was failed".

After the execution of step S14, S15 and S16, the management number configuration processing ends.

Next, a variable print processing executed in the image forming apparatus 1 is described with reference to FIG. 9. The variable print processing is to acquire the variable data from the information management apparatus 4, to convert it into two-dimensional barcode, then to composite it with the original print data and to print it.

For example, in the image forming apparatus 1, the controlling section 10 executes the variable print processing by a cooperation of the CPU and a variable print program read out from the ROM and developed on the RAM, where reception of the print data described below from the input apparatus 3 works as a trigger of the execution.

First, the print data transmitted from the input apparatus 3 is received on the communication section of the image forming apparatus 1, and it is judged whether the reception has been successful or not (step S21). The print data is the data designated in the input apparatus 3 previously. When it is configured on the input apparatus 3 that the variable print is performed, the print data is composed of the management number 51, print position 62, print information 64 and original print data 71. When it is configured on the input apparatus 3 that the variable print is not performed, the print data is composed of the original print data 71. When the print data is not received (step S21; NG), an error information is transmitted from the image forming apparatus 1 to the input apparatus 3 (step S29). The error information is to notice of failing a step of the variable print processing. For example, the error information corresponding to the current step is "Print data was not transmitted." Hereinafter, the error information to the failure in the steps corresponds to the processing of respective steps.

When the print data is received (step S21; OK), it is judged whether to perform the variable print or not (step S22). Here the judgment of the variable print is made by referring to the print data. When the print data is the original print data 71 (step S22; No), a normal printing is performed (step S28). The normal printing designates to print the original print data 71. When the print data is composed of the management number 51, print position 62, print information 64 and original print data 71 (step S22; Yes), the management number 51 and print information 64 previously designated in the input apparatus 3 are transmitted to the information management apparatus 4. Subsequently, the controlling section 40 of the information management apparatus 4 reads out the variable data corresponding to the management number 51 and print information 64, from the variable database 50. The read variable data is transmitted from the information management apparatus 4 to image forming apparatus 1. Then, the image forming apparatus 1 receives and acquires the variable data, and it is judged whether the acquisition has been successful or not (step S23). The acquisition method of the variable data is, for example, as follows. The http (hyper text transfer protocol) is used as the protocol between the image forming apparatus 1 and information management apparatus 4, and the image information apparatus 1 designates the management number 51 and print information 64 as parameters of the CGI (common gateway interface). When the variable data is not acquired (step S23; NG), the step shifts to S29.

When the variable data is acquired (step S23; OK), the variable data is converted into a two-dimensional barcode, and it is judged whether the two-dimensional barcoding has been successful or not (step S24). When the two-dimensional barcording is failed (step S24; NG), the process shifts to step S29.

When the two-dimensional barcoding is successful (step S24; OK), the original print data 71 and two-dimensional barcode AR are combined according to the print position 62, and it is judged whether the composition has been successful or not (step S25). When the composition of the original print data 71 and two-dimensional barcode AR is failed (step S25; NG), the process shifts to step S29.

When the composition of the original print data 71 and two-dimensional barcode AR is successful (step S25; OK), the composite data is printed on a recording medium, and it is judged whether the printing has been successful or not (step S26). The composite data designates the data shown in FIG. 7C. When the printing is failed (step S26; NG), the process shifts to step S29.

When the printing is successful (step S26; OK), it is judged whether there is another variable data or not (step S27). When there is another variable data (step S27; Yes), the process shifts to step S23. When there is no more variable data (step S27; No), the variable print processing ends. Also when the execution of the step 28 or 29 is completed, the variable print processing ends.

According to the present embodiment, the management number 51, print information 64 and original print data 71 are transmitted from the input apparatus 3 to the image forming apparatus 1. The image forming apparatus 1 acquires the variable data from the information management apparatus 4 based on the transmitted management number 51. Therefore, it is not necessary to transmit the variable data and the original print data 71 from the input apparatus 3 to the image forming apparatus 1, and effective information transmission can be achieved. Further, when a part of the variable data is to be changed, it is enough to change the variable data managed in the information management apparatus 4. Therefore, it is not necessary to change the variable data on both of the input apparatus 3 and image forming apparatus 1, and a work of a user can be reduced.

Further, the management number 51 and print information 64 can be received from the input apparatus 3, and the received management number 51 and print information 64 can be transmitted to the information management apparatus 4.

Further, the data range specification 63 to specify the management number 51 can be set on the operation section 31 of the input apparatus 3.

The above description to the present embodiment is to show one example of the image forming apparatus, image forming system and storage medium of the invention, and the present invention is not limited to the embodiment.

For example, in the above embodiment, the image forming apparatus 1 forms the two-dimensional barcode AR. However the present invention is not limited thereto, and the information management apparatus 4 previously may form the two-dimensional barcode AR.

In such case, for example, the image forming apparatus 1 transmits the management number 51 and print information 64 to the information management apparatus 4 to require the variable data. Then, the controlling section 40 of the information management apparatus 4 specifies the variable data based on the received management number 51 and print information 64, and converts the specified variable data into the two-dimensional barcode AR. The information management apparatus 4 transmits the two-dimensional barcode AR to the image forming apparatus 1. The controlling section 10 of the image forming apparatus 1 combines the two-dimensional barcode received from the information management apparatus 4 and original print data 71 from the input apparatus 3, and allows the printer section 16 to print it. The other composition is similar to the above embodiment.

According to such composition, since the information management apparatus 4 converts the variable data into the two-dimensional barcode AR, the image information apparatus 1 need not convert the variable data into the two-dimensional barcode AR. Thus, effective image forming can be achieved. Further, the input apparatus 3 transmits the management number 51, print information 64 and original print data 71 to the image forming apparatus 1, and the image forming apparatus acquires the variable data from the information management apparatus 4 based on the transmitted management number 51. Thus, the input apparatus need not transmit the variable data and original print data 71 to the image forming apparatus 1, and effective transmission of information can be achieved. Further, when a part of the variable data is to be changed, it is enough to change the variable data managed in the information management apparatus 4. Therefore, it is not necessary to change the variable data on both of the input apparatus 3 and image forming apparatus 1, and a work of a user can be reduced.

Further, instead of the composition where the information management apparatus 4 converts the variable data into the two-dimensional barcode AR, the information management apparatus 4 may store the two-dimensional barcode AR on the storage 43, together with the correspondence thereof with the variable data.

The detailed compositions and operations of the image forming apparatus 100 of the above embodiment may also be modified within the spirit of the present invention.

The present U.S. patent application claims a priority under the Paris Convention of Japanese patent application No. 2006-58190 filed on Mar. 3, 2006, which shall be a basis of correction of an incorrect translation.

What is claimed is:

1. An image forming system comprising:
    an image forming apparatus;
    an input apparatus; and
    an information management apparatus,
    wherein the image forming apparatus comprising:
        a communication section connected to the information management apparatus to manage a data with a correspondence of the data to management information and the input apparatus to accept manuscript information, to communicate with each other;
        an image forming section to form an image on a recording paper; and
        a controlling section to transmit the management information to the information management apparatus through the communication section, to receive the data corresponding to the transmitted management information from the information management apparatus, to convert the received data into barcode information, to form composite information by combining the barcode information and the manuscript information received from the input apparatus, and to allow the image forming section to form an image of the composite information,
    wherein the controlling section receives the management information from the input apparatus through the communication section, and transmits the received management information to the information management apparatus, and
    wherein the input apparatus comprises:
        an operation section to accept input information;
        a communication connection section connected to the information management apparatus and the image forming apparatus, to communicate with each other; and
        a communication controlling section to transmit the input information input on the operation section to specify the management information to the information management apparatus through the communication connection section, to receive the management information corresponding to the input information from the information management apparatus, and to transmit the received management information and the manuscript information to the image forming apparatus, and
    wherein the information management apparatus comprises:
        a storage to store the data with the correspondence of the data to the management information;
        an information communication section connected to the input apparatus and the image forming apparatus, to communicate with each other; and
        an information controlling section to receive the input information from the input apparatus through the information communication section, to specify the management information corresponding to the received input information among the management information in the storage, to specify the data corresponding to the received management information among the data in the storage, and to transmit the specified data to the image forming apparatus.

2. An image forming system comprising:
an image forming apparatus;
an input apparatus; and
an information management apparatus,
wherein the image forming apparatus comprises:
   an image forming section to form an image on a recording paper;
   a communication section connected to the input apparatus and the information management apparatus, to communicate with each other;
   a controlling section to transmit management information to the information management apparatus through the communication section, to receive barcode information corresponding to the transmitted management information from the information management apparatus, to form composite information by combing the received barcode information and the manuscript information received from the input apparatus, and to allow the image forming section to form an image of the composite information,
wherein the input apparatus comprises:
   an operation section to accept input information;
   a communication connection section connected to the information management apparatus and the image forming apparatus, to communicate with each other; and
   a communication controlling section to transmit the input information input on the operation section to specify the management information to the information management apparatus through the communication connection section, to receive the management information corresponding to the input information from the information management apparatus, and to transmit the received management information and the manuscript information to the image forming apparatus, and
wherein the information management apparatus comprises:
   a storage to store a data with a correspondence of the data to the management information;
   an information communication section connected to the input apparatus and the image forming apparatus, to communicate with each other; and
   an information controlling section to receive the input information from the input apparatus through the information communication section, to specify the management information corresponding to the received input information among the management information in the storage, to specify the data corresponding to the received management information among the data in the storage, to convert the specified data into the barcode information, and to transmit the barcode information to the image forming apparatus.

3. An image forming method comprising the steps of:
transmitting management information to an information management apparatus which manages a data with a correspondence of the data to the management information through a communication section connected to the information management apparatus and an input apparatus which accepts an input of manuscript information, to communicate with each other;
receiving a data corresponding to the transmitted management information from the information management apparatus;
forming composite information by converting the received data into barcode information and combining the barcode information and the manuscript information received from the input apparatus;
forming an image of the composite information; and
judging whether or not there is another data for the forming of an image of composite information,
wherein in the transmitting step, when it is judged there is another data in the judging step, the management information corresponding to the another data is transmitted.

4. A computer-readable medium storing a program causing a computer to function as the sections of:
   a communication section connected to an information management apparatus to manage a data with a correspondence of the data to the management information and an input apparatus to accept manuscript information, to communicate with each other;
   an image forming section to form an image on a recording paper; and
   a controlling section to transmit the management information to the information management apparatus through the communication section, to receive the data corresponding to the transmitted management information from the information management apparatus, to convert the received data into barcode information, to form composite information by combining the barcode information and the manuscript information received from the input apparatus, to allow the image forming section to form an image of the composite information, to judge whether there is another data for forming composite information, and to transmit the management information corresponding to the another data to the information management apparatus when it is judged there is the another data.

* * * * *

UNITED STATES PATENT AND TRADEMARK OFFICE
CERTIFICATE OF CORRECTION

| | | |
|---|---|---|
| PATENT NO. | : 7,710,621 B2 | |
| APPLICATION NO. | : 11/640920 | |
| DATED | : May 4, 2010 | |
| INVENTOR(S) | : Tatsuyoshi Haga | |

It is certified that error appears in the above-identified patent and that said Letters Patent is hereby corrected as shown below:

Claim 1, column 12, line 19, "comprising:" should read --comprises:--.

Claim 2, column 13, line 24, "combing" should read --combining--.

Signed and Sealed this
Eighteenth Day of January, 2011

David J. Kappos
*Director of the United States Patent and Trademark Office*